No. 841,561. PATENTED JAN. 15, 1907.
S. F. MUDGE.
ADJUSTABLE WHEEL TIRE.
APPLICATION FILED MAR. 5, 1906.
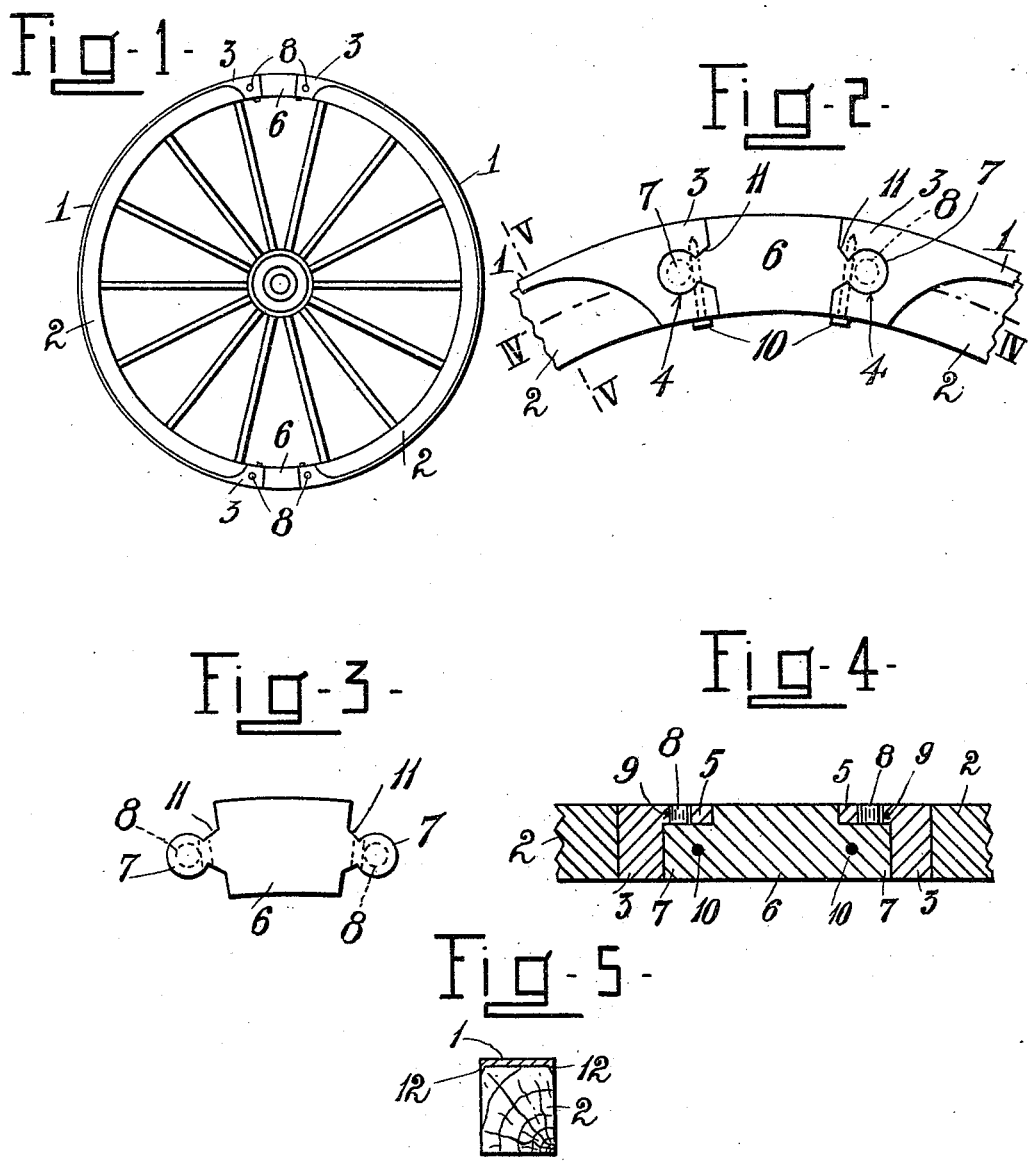
Witnesses
Inventor
Samuel Frederick Mudge
by James L. Norris
Attorney

UNITED STATES PATENT OFFICE.

SAMUEL FREDERICK MUDGE, OF ALBURY, NEW SOUTH WALES, AUSTRALIA.

ADJUSTABLE WHEEL-TIRE.

No. 841,561.         Specification of Letters Patent.        Patented Jan. 15, 1907.

Application filed March 5, 1906. Serial No. 304,341.

*To all whom it may concern:*

Be it known that I, SAMUEL FREDERICK MUDGE, auctioneer, a subject of the King of Great Britain, residing in Wilson street, Albury, in the State of New South Wales, Australia, have invented an Improved Adjustable Wheel-Tire, of which the following is a specification.

The object of this invention is to dispense with the necessity of cutting tires of vehicles for the purpose of loosening or tightening the wheel, and to this end the tire is made in sections which are joined together by tie-pieces of suitable size in the manner shown by the accompanying drawings, which comprise, Figure 1, an outside elevation of a wheel fitted with the adjustable tire; Fig. 2, an enlarged inside elevation showing one of the joints; Fig. 3, an enlarged side elevation of a tie-piece; Fig. 4, a horizontal section on line IV IV, Fig. 2; Fig. 5, a vertical section on line V V, Fig. 2.

Reference to the drawings shows that the tire is made, preferably, in two pieces 1 1, each a little shorter than half the circumference of the rim or felly of the wheel, which is correspondingly formed in sections 2 2, and the ends 3 3 of each piece of tire are enlarged to about the thickness of the rim or felly and formed with dovetail or circular recesses 4 4 extending partly through said tire from the inside thereof, leaving abutments or shoulders 5 5 on the outside. The ends of these two pieces of the tire are joined together by removable cambered tie-pieces 6 6 of variable sizes, having their ends 7 7 formed of corresponding shape to that of the recesses in the tire. The ends are preferably rounded, as shown in the drawings, and when inserted in the correspondingly-shaped recesses they hold the two sections of tire securely together and form same into a complete tire. By this dovetail joint the sections of the tire cannot be materially drawn apart; but in order to further insure this result the rounded ends of the tie-pieces are provided with extensions or pins 8 8, which project through corresponding lateral holes 9 9 in the abutments or shoulders 5 5 of the tire, Fig. 4.
In order to prevent the tie-pieces becoming detached by falling out at the side, they are preferably secured by bolts 10 10, extending through radial holes in the necks 11 11 of the ends of the tie-pieces and through corresponding holes in the enlarged ends of the tire-sections.

When the tire becomes too loose or tight, the tie-pieces 6 6 are removed and shorter or longer ones substituted accordingly. During this operation the two pieces of the tire are clamped in position by any suitable means.

The ends of the fellies or sections of the rim of the wheel abut against the thickened ends of the pieces of the tire, and the latter may be formed with feathered-edge flanges 12 12, adapted to fit around the sides of said rim in the manner shown in Fig. 5.

Although it is preferred to form the two pieces of tire in equal lengths, it will be obvious that the tire may be formed in three or more lengths joined together by a corresponding number of tie-pieces. The precise shape of the latter is also immaterial so long as its ends and the recesses they fit into are dovetailed, so as to effectually prevent the pieces of tire from being drawn apart.

Having now particularly described and ascertained the nature of my said invention and in what manner the same is to be performed, I declare that what I claim is—

1. An improved adjustable wheel-tire formed in sections, enlarged ends on said sections, dovetail recesses formed in said ends and tie-pieces formed with ends corresponding in shape to said recesses, in combination with a wheel having its rim formed in sections corresponding to the tire-sections.

2. In a wheel-tire of the kind described enlarged ends on each section of the tire, dovetail recesses extending from the inside and partly through said enlarged ends, a shoulder formed at the end of each recess, a hole extending through said shoulder, in combination with a cambered tie-piece, dovetail ends thereon and lateral pins on said ends substantially as described.

3. In a wheel-tire of the kind described an enlargement on each end of the tire-sections corresponding in thickness with the rim of the wheel, dovetail recesses extending from the inside and partly through said enlarged ends, a shoulder formed at the ends of each recess, a hole extending laterally through said shoulder, a feather-edge flange on said sections of tires, in combination with a tie-piece, dovetail ends thereon, lateral pins on said ends and fastening-bolts extending through said dovetailed ends and through the enlarged end of the tire-sections substantially as set forth.

4. In a wheel-tire of the kind described a cambered tie-piece, rounded ends on said tie-piece, a lateral extension on each of said ends, a narrow neck connecting said ends to the body of the tie-piece, and radial holes through said neck substantially as described.

In testimony whereof I have hereunto set my hand in presence of two subscribing witnesses.

SAMUEL FREDERICK MUDGE.

Witnesses:
CHARLES EDWARD GRAHAM,
HENRY WATCHORNE CLARKE.